(12) United States Patent
Zimmerman

(10) Patent No.: US 12,008,308 B1
(45) Date of Patent: Jun. 11, 2024

(54) CONTEXTUAL RESOURCE COMPLETION

(71) Applicant: Rocket Resume, Inc., San Jose, CA (US)

(72) Inventor: Stephen William Zimmerman, Austin, TX (US)

(73) Assignee: ROCKET RESUME, INC., San Jose, CA (US)

( * ) Notice: Subject to any disclaimer, the term of this patent is extended or adjusted under 35 U.S.C. 154(b) by 0 days.

(21) Appl. No.: 18/183,720

(22) Filed: Mar. 14, 2023

(51) Int. Cl.
*G06F 17/00* (2019.01)
*G06F 40/166* (2020.01)
*G06F 40/274* (2020.01)
*G06N 20/00* (2019.01)

(52) U.S. Cl.
CPC .......... *G06F 40/166* (2020.01); *G06F 40/274* (2020.01); *G06N 20/00* (2019.01)

(58) Field of Classification Search
CPC .... G06F 40/166; G06F 40/274; G06F 40/216; G06F 40/30; G06F 40/284; G06N 20/00
USPC ........................................................ 715/256
See application file for complete search history.

(56) References Cited

U.S. PATENT DOCUMENTS

| 11,580,145 | B1* | 2/2023 | Kumar | G10L 13/00 |
| 2019/0236132 | A1* | 8/2019 | Zhu | G06N 20/00 |
| 2019/0384762 | A1* | 12/2019 | Hill | G06F 16/2272 |
| 2022/0335043 | A1* | 10/2022 | Zheng | G06N 20/10 |
| 2023/0088601 | A1* | 3/2023 | Park | G10L 15/1822 704/270 |
| 2023/0124889 | A1* | 4/2023 | Robert Jose et al. | H04M 3/527 704/9 |

* cited by examiner

*Primary Examiner* — Jason T Edwards
(74) *Attorney, Agent, or Firm* — Dority & Manning, P.A.

(57) ABSTRACT

An example computer-implemented method for contextual prediction of content for a structured resource is provided. The example method includes providing, to an endpoint device, an input interface for inputting natural language content. The example method includes receiving, from the endpoint device via the input interface, an initial input of natural language content. The example method includes receiving context data associated with the endpoint device. The example method includes obtaining, using a machine-learned content generation model, and based on the initial input and the context data, a suggested portion of natural language content. The example method includes providing, to the endpoint device, the suggested portion.

20 Claims, 6 Drawing Sheets

CONTEXTUAL RESOURCE COMPLETION

BACKGROUND

Users can use automated tools for composing resources (e.g., structured resources). Automated tools can generate content for insertion into documents. Automated tools can include machine-learned models.

SUMMARY

Aspects and advantages of embodiments of the present disclosure will be set forth in part in the following description, or can be learned from the description, or can be learned through practice of the embodiments.

One example aspect of the present disclosure is directed to an example computer-implemented method for contextual prediction of content for a structured resource. The example method can include providing, to an endpoint device, an input interface for inputting natural language content. The example method can include receiving, from the endpoint device via the input interface, an initial input of natural language content. The example method can include receiving context data associated with the endpoint device. The example method can include obtaining, using a machine-learned content generation model, and based on the initial input and the context data, a suggested portion of natural language content. The example method can include providing, to the endpoint device, the suggested portion.

One example aspect of the present disclosure is directed to an example computing system. The example computing system can include one or more processors and one or more non-transitory computer-readable media storing instructions that are executable by the one or more processors to cause the example computing system to perform operations for contextual prediction of content for a structured resource. For the example computing system, the operations can include providing, to an endpoint device, an input interface for inputting natural language content. For the example computing system, the operations can include receiving, from the endpoint device via the input interface, an initial input of natural language content. For the example computing system, the operations can include receiving context data associated with the endpoint device. For the example computing system, the operations can include obtaining, using a machine-learned content generation model, and based on the initial input and the context data, a suggested portion of natural language content. For the example computing system, the operations can include providing, to the endpoint device, the suggested portion.

One example aspect of the present disclosure is directed to one or more example non-transitory computer-readable media storing instructions that are executable by one or more processors to cause a computing system to perform operations for contextual prediction of content for a structured resource. For the example non-transitory computer-readable media, the operations can include providing, to an endpoint device, an input interface for inputting natural language content. For the example non-transitory computer-readable media, the operations can include receiving, from the endpoint device via the input interface, an initial input of natural language content. For the example non-transitory computer-readable media, the operations can include receiving context data associated with the endpoint device. For the example non-transitory computer-readable media, the operations can include obtaining, using a machine-learned content generation model, and based on the initial input and the context data, a suggested portion of natural language content. For the example non-transitory computer-readable media, the operations can include providing, to the endpoint device, the suggested portion.

Other example aspects of the present disclosure are directed to other systems, methods, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which refers to the appended figures, in which.

DETAILED DESCRIPTION

Figure 1:
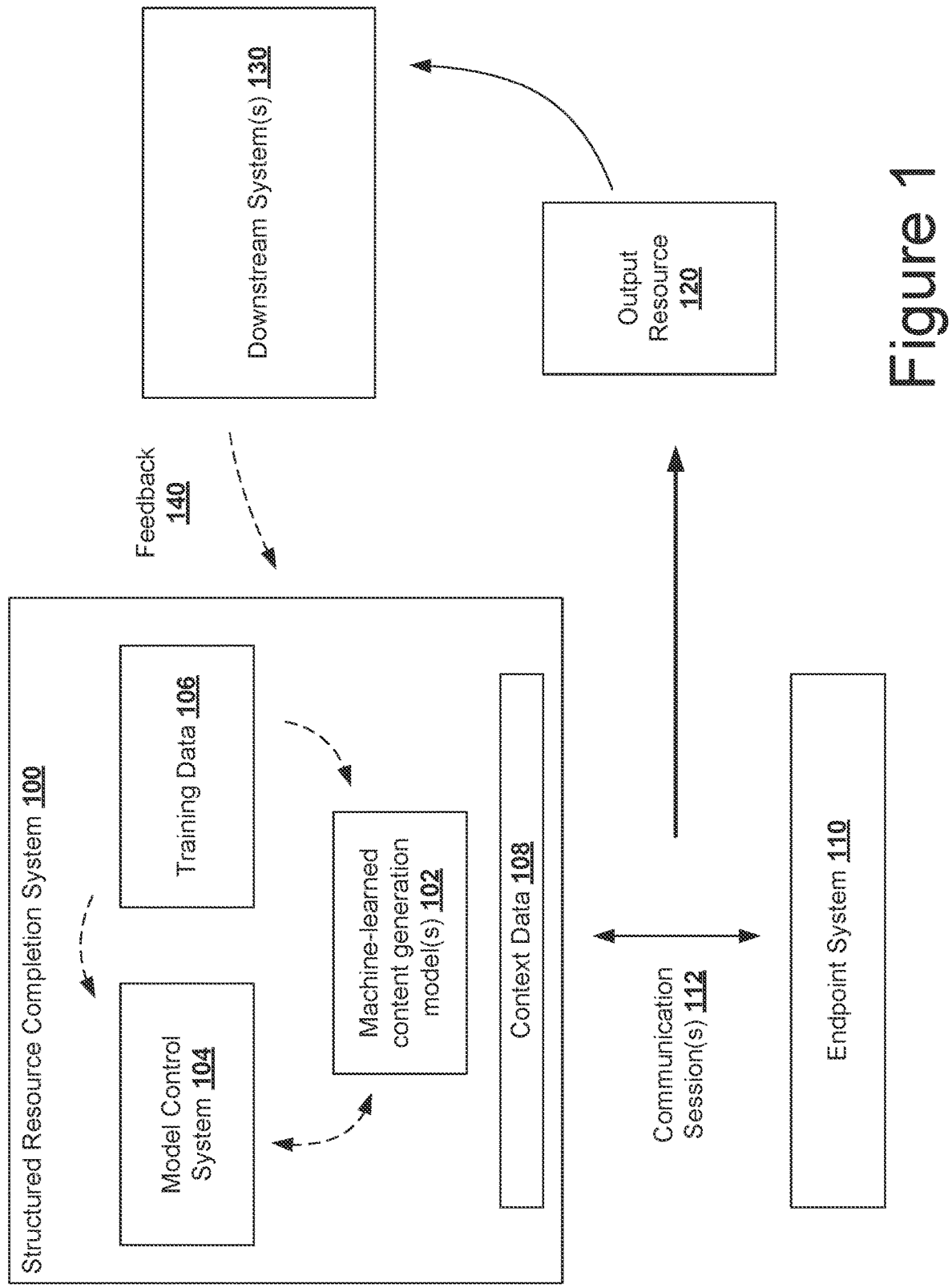
FIG. 1 is a block diagram of an example system for contextual structured resource completion according to some implementations of the present disclosure.

Example implementations of the present disclosure generally provide for a contextual structured resource completion framework. For example, a user interface can be provided to an endpoint device for composing a structured resource. The structured resource can include a schema for organizing information. The structured resource can be exported or otherwise rendered into a desired output format, such as a document. A user interface can include a web interface, a local application, etc. A user can enter content (e.g., natural language content) using the interface. Based on the entered content, an example structured resource completion framework can generate content for completing all or part of the structured resource. The content can be generated using a machine-learned content generation model (e.g., a large language model). The machine-learned content generation model can be trained, fine-tuned, or instructed based on a training corpus of training content. The content can be provided to the endpoint device as suggested content for completing the structured resource.

For instance, a user can sign into an account associated with a web-based content generation system. An example web-based content generation system can include a resume generation service. The user can initiate a session with a web-based user interface provided by the system. The user can browse information available via the interface. The user can input data via the interface. For instance, the user can be asked questions regarding the user's work experience or other pertinent information. The user can input natural language inputs to the interface. The content generation system can process the inputs using a machine-learned content generation model to generate suggested content (e.g., suggested language for a portion of a resume).

Advantageously, example structured resource completion frameworks according to the present disclosure can process the inputs in view of additional context data. The context data can be associated with user engagement with the contextual structured resource completion framework. The additional context data can include user interest data. For instance, users can engage with content on a webpage associated with the framework. Such engagement can be characterized in session data and passed as an input to the machine-learned model.

The additional context data can include context data associated with user inputs to the framework. For instance, user inputs can include selections of suggested content. The framework can suggest candidate content items in an ordered presentation, and a user can select one of the candidate content items. The additional context data can include the ordering of the selected candidate content item in the presentation, the content of candidate content items that were not selected (e.g., the content of higher-ranked items).

In this manner, for instance, context data associated with a user session can be used to improve the generation of natural language content. Advantageously, such context data can facilitate obtaining the improvements by capturing latent user preferences or interests that can be implicitly represented in existing user interactions with the framework. In this manner, for instance, the framework can use such context data to obtain richer inputs for obtaining improved outputs.

For instance, user inputs to the framework when composing a structured resource can be characterized by session data and used to form inputs to the machine-learned model. For instance, user inputs can indicate selection of suggested content for composing a structured resource. The selection of suggested content can be used to inform future suggestions. The suggestions that were not selected can also be used to inform future suggestions.

For instance, with reference again to an implementation of a web-based content generation system, session data associated with the user's account can be passed to the content generation system to provide contextual inputs to the machine-learned content generation model. The session data can be updated in real time. For instance, the content generation system can provide suggestions to the user via the web-based interface for language to include in a resume. For instance, a list of job summary options can be presented in response to the user's input indicating a job title. The user can select a preferred option. The user's selection of the preferred option can be used to confirm that the preferred option is to be included in the output content. The user's selection of the preferred option can also be used to provide feedback to the system about the options that were not selected. For instance, aspects in which the preferred option differs from other unselected options can be associated with a preference of the user. The differences can be used to instruct the machine-learned content generation model in a subsequent round of suggestions to incorporate the user preferences. Latent signals of user preferences can thus be used to iteratively refine model suggestions of natural language content.

Example implementations of the present disclosure can also incorporate feedback from downstream recipients of composed structured resources to refine the suggestion of content. For instance, users can use the framework to compose structured resources for distribution using one or more downstream systems. For instance, a structured resource can be or include a resume or curriculum vitae that can be distributed to or through various recruitment platforms. Engagement with or feedback on the structured resources can be collected. For instance, structured resources can be rated, flagged, or otherwise marked for further consideration. Hiring decisions can be entered into the downstream systems. These feedback signals can be fed back to the framework and can be used to inform the suggestion of content for future structured resources. For instance, an objective for training one or more machine-learned components of the contextual structured resource completion framework can be based on a positive feedback rate.

Some existing text suggestion techniques are generally limited to providing suggested word(s) based on local context (e.g., automatic spelling correction based on surrounding words, etc.). Some prior language suggestion techniques generally rely on a user's explicit inputs. For instance, some prior approaches are unable to capture and respond to user preferences implicit in a user's interactions with a system. Such limitations can lead to inefficient processing, lower quality results, and heightened user frustration.

In contrast, example implementations of the present disclosure can provide a number of technical effects and benefits. For instance, an example structured resource completion framework can provide an improved structured input interface for interacting with machine-learned content generation models. For instance, suggested content can be packaged within an ordered presentation structure. The structure of the ordered presentation can be used to index inputs provided by the user in response to the suggested content. Such indices associated with the inputs can be used to automatically compose supplemental contextual inputs for future suggestions. In this manner, for instance, example structured interfaces can capture and leverage latent user preferences and intents in addition to inputs explicitly provided. Such latent user preferences can also include context data obtained from prior user interactions. Latent user preferences can be provided as inputs to the machine-learned content generation model(s) to further instruct the model(s) according to the user's intent and explicit requests, thereby improving the efficiency of the interface, often requiring fewer inputs, decreasing processing time and energy usage. Further, example interface structures can more efficiently make use of output rendering capacity (e.g., for rendering graphical user interfaces) by improving the richness of data inputs without necessarily increasing the rendering complexity or size of the interface. In this manner, for instance, example implementations can improve the functioning of computing systems by improving the efficiency with which computing resources are used (e.g., processing bandwidth, electrical energy, interface rendering resources, etc.).

Further, example interfaces can leverage a model control system to generate instructions to input to the machine-learned content generation model. The model control system can receive inputs that include responses to simple, user-friendly questions. Based on the received inputs, the model control system can generate instructions for the machine-learned content generation model. In this manner, for instance, a user can generate content by interacting with an interface layer on top of the machine-learned content generation model. Thus, model updates and improvements can be implemented invisibly to the user. For instance, updates to the type, style, or content of model instructions can be implemented by updating the model control system. Thus the user's same inputs to the user-friendly interface can offer improved performance when the updated model control system is implemented on the back end. In this manner, for instance, improved system performance can be obtained with greater reliability and updates can be rolled out with greater uptake by automatically generating and executing the model inputs for the user.

For instance, an example structured resource completion framework can provide an improved set of training data for training machine-learned models to perform structured resource completion tasks. The improved training data can include example completed structured resources associated with engagement data. Engagement data can include feedback on the quality of the structured resource as well as feedback on eventual outcomes associated with a task for which the structured resource was completed. In this manner, for instance, training data can be compiled for training machine-learned models to complete structured resources for downstream objectives. For instance, such training data can provide for training machine-learned models to understand a goal that the user is trying to accomplish with the structured resource and guide the generated content toward accomplishing that goal, even when, for instance, a user may not know how best to accomplish that goal. For instance, some users may not know how or what to input to the machine-learned content generation model to complete a structured resource in a manner consistent with their goals. Traditional techniques that train models to simply mimic what users have done in the past can fail to perform beyond the experience level of the originators of the training example corpus over which the models have been trained. By compiling example improved training data of the present disclosure that considers downstream outcomes associated with the structured resource (e.g., engagement with a resume, or a hiring decision associated with a resume), example implementations of techniques of the present disclosure advantageously provide for improved processing capabilities of machine-learned models that can surpass the experience level of example authors and better tailor the generated content toward outcome-effective formulations, even when it can be outside any given user's capability to provide inputs effective to achieve the same quality. In this manner, for instance, providing for new and improved input data streams to a training data store can unlock new capabilities for example machine-learning systems.

With reference to FIGS. 1-6, example implementations of the present disclosure are discussed in further detail.

FIG. 1 is a block diagram of an example system for contextual structured resource completion according to some implementations of the present disclosure. A structured resource completion system 100 can implement one or more machine-learned content generation model(s) 102 for performing contextual structured resource completion. The machine-learned content generation model(s) 102 can be controlled (e.g., instructed, trained, updated, etc.) by model control system 104. For instance, machine-learned content generation model(s) 102 can be trained using training data 106 to generate content. The machine-learned content generation model(s) 102 can generate content using context data 108 associated with an endpoint system 110. For instance, endpoint system 110 can engage in communication session(s) 112 with the structured resource completion system 100 to obtain generated content for completing an output resource 120. The output resource 120 can be delivered to one or more downstream system(s) 130. The downstream system(s) 130 can associate the output resource 120 with one or more feature values that can be passed as feedback 140 back to structured resource completion system 100. For instance, feedback 140 (and the output resource 120) can be incorporated into training data 106.

Structured resource completion system 100 can be configured for contextual completion of substantially any type of content for a structured resource. A structured resource can be or include a collection of data configured to record and present information in a desired manner. Structured resources can include substantially any type of data, including textual data, image data, audio data, video data, etc.

A structured resource can be or contain a document, such as a resume, curriculum vitae, a letter (e.g., a cover letter), or other document. The document can contain data organized within a structure (e.g., a formatting structure, a narrative structure) to present different types of information in an organized fashion for communicating such information in an efficient manner. A structured resource can be implemented in any type of document file format (e.g., xml-based file formats, page description language file formats, markup languages, etc.). A structured resource can be implemented as one or more database entries or tables associated with a user. A structured resource can be organized in a hierarchical manner. A structured resource can contain one or more data objects corresponding to a given data type. For instance, an example data type can correspond to a "work experience" category for a given user. Multiple data objects can be stored for that category, such as a data object for each of the user's prior employment engagements. Each data object can contain various defined characteristics, such as a title, a description, a date range, etc. For instance, the title or description can be generated using machine-learned content generation model(s) 102.

The structured resource can collect one or more types of data in a schema that organizes data based on one or more classifications for the data. For instance, in the context of a resume document, data associated with an educational background can be classified as educational background data. Data associated with a work experience can be classified as work experience data. Based on the classification for a data item, the data item can be stored within the structure of the structured resource (e.g., with a tag associated with the data type, etc.).

A structured resource can be composed to provide a desired functionality. For instance, a resume or curriculum vitae can be a document that is composed to function as a summary of a given person's professional and personal experiences and qualifications. Data in the document can be compiled based on a relevance to the function of the document. The expression of the data in the document can be crafted based on an association between the expression type and the function of the document.

Multiple different documents can be generated using a structured resource. The data organized within the structured resource can be output in a variety of formats. For instance, an output format can be a document on a page (e.g., a page mimicking a printed page). An output format can be a document prepared for web viewing or distribution (e.g., a web page, a blog post, a social media profile, etc.). An output format can be audiovisual, such as a narrated portfolio of work, etc.

A structured resource can contain short form natural language content. For instance, a structured resource can be generated for export as a resume document. The resume document can include short form natural language content summarizing a variety of aspects of a person's work history.

A structured resource can contain long form natural language content. Long form natural language content can include multiple sentences that flow together (e.g., continuous or contiguous paragraphs) to provide a narrative. For instance, a structured resource can be generated for export as a cover letter document, optionally associated with the resume document. The cover letter document can include long form natural language content that describes in more detail selected aspects of the person's experience as applied to a given job application. Information stored within the schema associated with the structured resource can be retrieved by structured resource completion system 100 to build the structured resource as needed for a given task.

The data in the structured resource can be used differently based on a desired exported document type. For instance, for a resume document type, a first set of data types can be used, such as education history data, short-form work experience summaries data, etc. For a cover letter document type, a second set of data types can be used, such as a long-form narrative data type.

Structured resource completion system 100 can process inputs from a user to generate content for inclusion in a structured resource. The generated content can be any part of the structured resource. The generated content can include data compiled by structured resource completion system 100 based on a determined relevance to the user's task (e.g., relevance to a desired functionality of the structured resource). The generated content can include expressive formats or styles selected by the structured resource completion system 100 based on a determined relevance to the user's task (e.g., relevance to a desired functionality of the structured resource).

In some examples, the structured resource completion system 100 can generate content for composing a resume or curriculum vitae. The content can include natural language content generated for inclusion in one or more sections of the resume, such as prior job descriptions, summaries of past experiences, and pertinent details thereof. Such sections of the resume can correspond to different data types for storage in association with the schema of the structured resource. Structured resource completion system 100 can compile such data based on a relevance to the functionality of the resume. The functionality can be general or specific. The functionality can include, at a general level, obtaining a job. The functionality can include, at a more granular level, obtaining a job in a particular field or with a particular employer. Structured resource completion system 100 can determine the desired functionality and thereby determine the relevance of various data items, or at least expressions thereof, for compiling into the generated content for completing the structured resource.

Structured resource completion system 100 can be configured to generate content based on provided inputs such that the generated content is consistent with the provided inputs. For instance, when generating content for a resume, structured resource completion system 100 can be configured to receive inputs descriptive of a user's experiences. Structured resource completion system 100 can be configured to generate content that captures salient data from the user's experiences in an expressive format determined to improve the functionality of the resume toward its desired end. Structured resource completion system 100 can be configured to (with confirmation of a user) expand on provided input data. Structured resource completion system 100 can be configured to determine content data associated with a set of input data for inclusion in the compiled structured resource. For instance, if a user provides a general job description, structured resource completion system 100 can be configured to predict associated experiential datapoints that are expected to be associated with such a job description and are determined to improve the structured resource's functionality toward its end use.

Structured resource completion system 100 can be implemented on one or more computing devices. Structured resource completion system 100 can operate to complete structured resources as a web service. Structured resource completion system 100 can be implemented on one or more servers for servicing one or more client devices (e.g., including endpoint system 110).

Structured resource completion system 100 can operate to complete structured resources as a local application (e.g., operating on an endpoint system 110). Structured resource completion system 100 can be a part of, installed on, or instructed or controlled by endpoint system 110. Structured resource completion system 100 can operate as an application in a virtual environment accessible by the endpoint system 110.

Structured resource completion system 100 can implement the machine-learned content generation model(s) 102 optionally using a model control system 104. For instance, structured resource completion system 100 can store (e.g., in memory) any one or all of machine-learned content generation model(s) 102, model control system 104, and training data 106. Structured resource completion system 100 can leverage (e.g., execute, interact with, etc.) machine-learned content generation model(s) 102, model control system 104, or training data 106, any one or all of which can be optionally stored external to structured resource completion system 100.

The machine-learned content generation model(s) 102 can be or include various types of machine-learned models. Machine-learned content generation model(s) 102 can be configured to process inputs received from a user of the endpoint system 110 in view of context data 108 to generate content for completing a structured resource. The machine-learned content generation model(s) 102 can be or include a language model for generating natural language content (e.g., a large language model (LLM)). The machine-learned content generation model(s) 102 can be or include an image generation model for generating image content (e.g., artistic images, document formatting graphics, document layouts, etc.). The machine-learned content generation model(s) 102 can be configured to process multimodal inputs, such as image data merged with language data. For instance, image data can include images of document samples (e.g., scans of paper documents, image-based renders of document files, etc.).

The machine-learned content generation model(s) 102 can include various other algorithms, models, heuristics, and generative decision-making components. For instance, the machine-learned content generation model(s) 102 can be a hybrid of one or more machine-learned components with one or more curated or hand-crafted models or heuristics. The machine-learned content generation model(s) 102 can include hand-crafted components that can constrain the operation of the machine-learned content generation model(s) 102 based on the operational domain. The machine-learned content generation model(s) 102 can include hand-crafted components that provide realistic boundaries for responses from the machine-learned content generation model(s) 102.

The machine-learned content generation model(s) 102 can be configured to respond to input queries explicitly requesting an output (e.g., "Provide a summary of job [X] at employer [Y]"). The machine-learned content generation model(s) 102 can be configured to process queries implicitly, such that an input of an initial datapoint is parsed and expanded and re-expressed according to a determined strategy to improve the structured resource's functionality. For instance, the user's initial input of a job description can trigger generation of an intermediate input for machine-learned content generation model(s) 102.

Model control system 104 can provide connectivity between the machine-learned content generation model(s) 102 and other components internal or external to structured resource completion system 100. For instance, model control system 104 can provide an application programming interface (API) for interfacing with the machine-learned content generation model(s) 102. Such an API can be used internally within structured resource completion system 100 for feeding inputs to and receiving outputs from the machine-learned content generation model(s) 102. The API can be exposed externally for receiving inputs for input to the machine-learned content generation model(s) 102 and for outputting outputs from the machine-learned content generation model(s) 102.

Model control system 104 can be configured to instruct the machine-learned content generation model(s) 102 to generate content. For instance, model control system 104 can feed inputs to the machine-learned content generation model(s) 102 with context data 108. Model control system 104 can input prompts for prompting the machine-learned content generation model(s) 102 to generate the desired content. Model control system 104 can generate, refine, or select prompts for prompting the machine-learned content generation model(s) 102. Model control system 104 can obtain the prompts optionally using context data 108.

Model control system 104 can construct inputs to obtain a determined effective datatype for a given functionality. For instance, for an input job title, model control system 104 can provide an input to the machine-learned content generation model(s) 102 that is configured to cause the machine-learned content generation model(s) 102 to determine an expression of the job title (e.g., "What is a [job title] best known as in [X] industry," etc.). If model control system 104 determines that generated description is requested or would be of interest, model control system 104 can provide an input to the machine-learned content generation model(s) 102 that is configured to cause the machine-learned content generation model(s) 102 to generate the description (e.g., "Provide a description of [job title]," etc.).

Model control system 104 can compile input data structures from existing content of a work-in-progress (WIP) structured resource. For instance, model control system 104 can obtain data describing a current state of a structured resource and instruct the machine-learned content generation model(s) 102 to generate content that would follow, based on the current state. For instance, model control system 104 can construct an input sequence that includes a string that contains all or part of the current WIP resource as a prefix to a question or instruction (e.g., "Provide a description of [work experience] in view of the prepended resume," etc.).

Model control system 104 can instruct the machine-learned content generation model(s) 102 by selecting one or more operational pathways within the machine-learned content generation model(s) 102 for generating desired content. Model control system 104 can select among pathways of the machine-learned content generation model(s) 102 using hand-crafted heuristics or using machine-learned techniques. For instance, different pathways of the machine-learned content generation model(s) 102 can be used for generating content associated with different sections or datatypes of a structured resource (e.g., different sections of a document). Different pathways of the machine-learned content generation model(s) 102 can be used for generating content associated with different types or categories of documents (e.g., resumes for different industries, a cover letter, etc.).

Model control system 104 can parse inputs to a user interface and generate instructions for machine-learned content generation model(s) 102 from the parsed inputs. For instance, model control system 104 can obtain data indicating a selection of a desired output document type (e.g., "resume" or "cover letter"). Model control system 104 can, based on the determined selection, generate an instruction for instructing machine-learned content generation model(s) 102 to generate content for a structured resource for inclusion in the selected desired output document type. Model control system 104 can obtain data indicating a designation of a desired audience or recipient (e.g., a name of a hiring manager, a name of an employer, etc.). For instance, a user interface can provide an input field for designating the recipient. Model control system 104 can, based on the determined designation, generate an instruction for instructing machine-learned content generation model(s) 102 to generate content for a structured resource associated with the desired audience or recipient (e.g., "Write a cover letter addressed to [X] regarding a job application for the position of [Y]," where X and Y are provided by a user in corresponding input field(s); "An applicant has the following resume: [R]. Write a letter addressed to [X] regarding a job application for the position of [Y]," where X and Y are provided by a user in corresponding input field(s) and [R] is loaded from one or more fields of a structured resource; etc.).

Model control system 104 can process uploaded documents and generate instructions for machine-learned content generation model 102 based on the uploaded documents. An uploaded document can be uploaded (e.g., from an endpoint device) in a machine-readable format, such as a text file, an xml-based file, etc. An uploaded document can be uploaded (e.g., from an endpoint device) in an image-based format that can be processed with optical character recognition (OCR) or other image-to-text processing techniques. Text, images, and other content parsed from the uploaded document(s) can be processed for generating instructions for machine-learned content generation model(s) 102. For instance, a resume document can be uploaded and processed as resume [R] as in the example instruction, "An applicant has the following resume: [R] . Write a letter addressed to [X] regarding a job application for the position of [Y]," where X and Y are provided by a user in corresponding input field(s).

Model control system 104 can be configured to use one or more of machine-learned content generation model(s) 102 to process context data 108. Model control system 104 can generate instructions for machine-learned content generation model(s) 102 based on context data 108. Context data 108 can be used to generate inputs for the machine-learned content generation model(s) 102. For instance, instructions provided to the machine-learned content generation model(s) 102 can include, for instance, "Provide a summary of [job title] in the style of [X] with the following characteristics: [Y]," wherein X and Y can be determined based on context data 108. For instance, context data 108 can include user preferences or interests that can prescribe characteristics of the instruction. Instructions provided to the machine-learned content generation model(s) 102 can include, for instance, "Provide a summary of [job title] in the style of a writer who prefers the phrasing of [X] to the phrasing of [Y]," wherein X and Y can be determined based on context data 108 from past inputs of the user in which the user indicated a preference of X over Y.

Model control system 104 can pass context data 108 to one or more of machine-learned content generation model(s) 102 to generate an embedding from the context data 108. The embedding can be used as a latent context vector for input to one or more other models of the machine-learned content generation model(s) 102 (e.g., a language model, a prompt generation model, etc.). For instance, a latent context vector can be used to improve the relevance of the outputs of the machine-learned content generation model(s) 102 for a particular user, session, or structured resource.

Context data 108 can include data descriptive of one or more features or characteristics associated with a user account or user session for which structured resource completion system 100 is generating content. Context data can include user account data, including user activity data with the structured resource completion system 100. User account data can include account type, such as personal or professional, free or paid, etc. User account data can include activity frequency, such as frequency of use of structured resource completion system 100. User account data can include data descriptive of present or past sessions of that user account for which structured resource completion system 100 generated content. User account data can include a record of feedback given by the user regarding the prior generated content. User permission can be obtained to use user account data, or any other context data. Context data 108 can be transient, customizing performance of the machine-learned content generation model(s) 102 for a particular session. Context data 108 can be persisted across sessions for customizing performance of the machine-learned content generation model(s) 102 for a particular user over time over multiple sessions.

User account data can include interest data. Interest data can be obtained from session data describing browsing of content associated with the structured resource completion system 100. For instance, various additional content can be available to users of the structured resource completion system 100 for perusal (e.g., on one or more web pages, etc.). Interest data can include a record of the topics of content viewed, favorited, saved, or otherwise distinguished among other types of content. For instance, additional content can include example documents (e.g., example resumes, etc.), educational content (e.g., "how-to" or style guides), editorial content (e.g., commentary on recent hiring trends, etc.), and the like.

User account data can include interactions with support systems associated with structured resource completion system 100. For instance, user account data can include communications to or from such support systems (e.g., communications to or from a customer service portal associated with structured resource completion system 100). Communications can include discussions of (e.g., complaints about) particular documents, generated content, or expressive styles. Communications can thus provide contextual cues to structured resource completion system 100 regarding user preferences and styles.

User account data can describe interactions with one or more interfaces of structured resource completion system 100 over multiple sessions. User account data can describe interactions with one or more interfaces of structured resource completion system 100 over a single session (e.g., a current session).

Context data 108 can include data descriptive of interactions with structured resource completion system 100 by an endpoint system 110 in a communication session 112. Context data 108 can include various features of interactions, including explicit input data, implicit features of the input data, descriptions of the context in which data was input, and the like. Context data 108 can include inputs specifying a type or goal for output resource 120. For instance, a type of resource can include a short-form type of resource (e.g., a resume with a plurality of short-form summaries or bullets). A type of resource can include a long-form type of resource (e.g., a cover letter with one or more longer passages). A goal for a resource can include a target audience (e.g., an identified or unidentified recipient). A goal for a resource can include a subject of the resource (e.g., a specific job position for a resume, cover letter, etc.). A goal for a resource can include an entity associated with a recipient (e.g., a business entity to which the user is applying for employment, etc.).

Context data 108 can be associated with an endpoint system 110 by nature of the participating device(s) in the communication session 112. For instance, context data 108 can be received from an endpoint system 110 or generated by structured resource completion system 100 based on interactions with the endpoint system 110. Context data 108 can be associated with an endpoint system 110 based on a user account associated with both the context data 108 and the endpoint system 110.

Endpoint system 110 can be or include one or more computing devices. For example, endpoint system 110 can include a personal computing device, a mobile computing device, a shared terminal interface, etc. Endpoint system 110 can render an interactive interface for engaging with structured resource completion system 100 to obtain or generate content for completing a structured resource. The interactive interface can be obtained from structured resource completion system 100. For instance, structured resource completion system 100 can provide a web-based portal accessible by a browser or other application on the endpoint system 110. The interactive interface can be rendered by a native application implementing the structured resource completion system 100. The interface can be rendered by implementing a locally stored and natively executing interface that initiates API calls to the structured resource completion system 100.

The interactive interface can include a structured interface for inputting inputs for processing by the structured resource completion system 100. Inputs can include inputs for triggering one or more suggested portions of content generated by the structured resource completion system 100. The interactive interface can include a structured interface for rendering (e.g., displaying) suggested content generated by the structured resource completion system 100. The interactive interface can include interactive input elements configured for selecting or confirming the suggested content generated by the structured resource completion system 100 for inclusion in the WIP structured resource. The interactive interface can include a panel for rendering the current state of the WIP structured resource.

Communication sessions 112 between endpoint system 110 and structured resource completion system 100 can include any suitable technique for passing messages, states, or values between endpoint system 110 and structured resource completion system 100. When an example structured resource completion system 100 is implemented in a server environment for serving endpoint system 110 as a client, communication sessions 112 can take the form of web communications over any suitable web communication protocol (e.g., http/s, websocket(s), etc.). When an example structured resource completion system 100 is implemented locally (e.g., on endpoint system 110), communication sessions 112 can take the form of messages, values, or states passed between an interface code component and the structured resource completion system 100.

Output resource 120 can be output by structured resource completion system 100. Output resource 120 can be output by endpoint system 110 based on content generated by structured resource completion system 100. Output resource 120 can be locally stored or stored remotely, such as stored in association with a user account on structured resource completion system 100.

Output resource 120 can be a document based on a structured resource generated by the structured resource completion system 100. Output resource 120 can be or include a copy of all or part of a structured resource generated by the structured resource completion system 100. Output resource 120 can be composed of selected components (e.g., data objects, strings, etc.) stored in a structured resource generated by the structured resource completion system 100. Multiple output resource(s) 120 can be based on a given structured resource.

Output resource 120 can be a web-based resource, such as a social media post, social media homepage, webpage, etc. Output resource 120 can include text, images, audio, video, etc. Output resource 120 can be a resume, curriculum vitae, cover letter, etc. Output resource 120 can be a document file format (e.g., a portable document file, an xml-based file format, etc.), an image file format (e.g., a vector-based file format, a bitmap-based file format, etc.), or other file formats.

Output resource 120 can be transmitted to downstream system(s) 130. Output resource 120 can be transmitted to downstream system(s) 130 from structured resource completion system 100. Output resource 120 can be transmitted to downstream system(s) 130 from endpoint system 110.

Downstream system(s) 130 can include a computing system associated with a recipient of the output resource 120. For instance, for a resume output resource 120, downstream system(s) 130 can include various recruiting service platforms, employer human resources systems, social media platforms, and the like.

Downstream system(s) 130 can be associated with an outcome associated with the output resource 120. For instance, output resource 120 can be associated with a target functionality, such as providing relevant data configured to effectively present data descriptive of a user's experience for obtaining a job offer. An outcome associated with the output resource 120 can correspond to the target functionality. An outcome associated with the output resource 120 can be a hiring decision. An outcome associated with the output resource 120 can be awareness or engagement of the output resource 120, such as views, "likes," favorites, subscribers, followers, downloads, shares, etc.

Feedback 140 can be or include data descriptive of an outcome associated with the output resource 120. Feedback 140 can be pushed to structured resource completion system 100 from the downstream system(s) 130. Feedback 140 can be scraped or crawled by structured resource completion system 100 from downstream system(s) 130.

Feedback 140 can be added to training data 106 for improving the performance of structured resource completion system 100. Feedback 140 can be added to training data in association with output resource 120. User permission can be obtained to use output resource 120 and any feedback 140.

Model control system 104 can be configured to train the machine-learned content generation model(s) 102. For instance, model control system 104 can be configured to retrieve training examples from training data 106. Model control system 104 can construct training, test, and validation subsets from training data 106. Model control system 104 can generate training examples for the training data 106. For instance, model control system 104 can apply data augmentation, data modification, or other techniques for generating a training set for unsupervised training of the machine-learned content generation model(s) 102. For natural language components of the machine-learned content generation model(s) 102, model control system 104 can implement masking or corruption or other techniques obtaining training examples for unsupervised training of machine-learned content generation model(s) 102 on spans of a natural language corpus. For natural language components of the machine-learned content generation model(s) 102, model control system 104 can implement sequence-to-sequence training examples for unsupervised training of machine-learned content generation model(s) 102 on spans of a natural language corpus.

Model control system 104 can be configured to train the machine-learned content generation model(s) 102 using one or more parameter update techniques. Model control system 104 can be configured to determine a loss associated with a training output of the machine-learned content generation model(s) 102. The loss can be based on a comparison of a training output of the machine-learned content generation model(s) 102 and a ground truth value. The loss can be used to evaluate the performance of the machine-learned content generation model(s) 102. Based on the evaluated performance, model control system 104 can determine one or more updates to parameters or hyperparameters of the machine-learned content generation model(s) 102 (e.g., using back-propagation, etc.).

Model control system 104 can implement reinforcement learning techniques to train machine-learned content generation model(s) 102 to, for instance, learn to improve the quality of feedback 140. Reinforcement learning can include optimizing machine-learned content generation model(s) 102 to increase a reward or decrease a penalty received based on its output. The reward/penalty can be determined based on user feedback. The reward/penalty can be determined based on feedback from a designated panel of reviewers.

Model control system 104 can train machine-learned content generation model(s) 102 from scratch on training data 106 (e.g., from a randomly initialized state). Model control system 104 can fine-tune a pre-trained machine-learned content generation model 102 on training data 106. For instance, machine-learned content generation model(s) 102 can include a language model trained for general language understanding, and model control system 104 can fine-tune the machine-learned content generation model(s) 102 on training data 106 associated with a particular domain (e.g., resume documents, cover letter documents, etc.).

Training data 106 can include a corpus of training examples. Training examples can include example structure resources, documents, feedback signals, and other data sources curated to train machine-learned content generation model(s) 102 to generate content for structured resources based on patterns learned from a corpus of examples.

Figure 2:
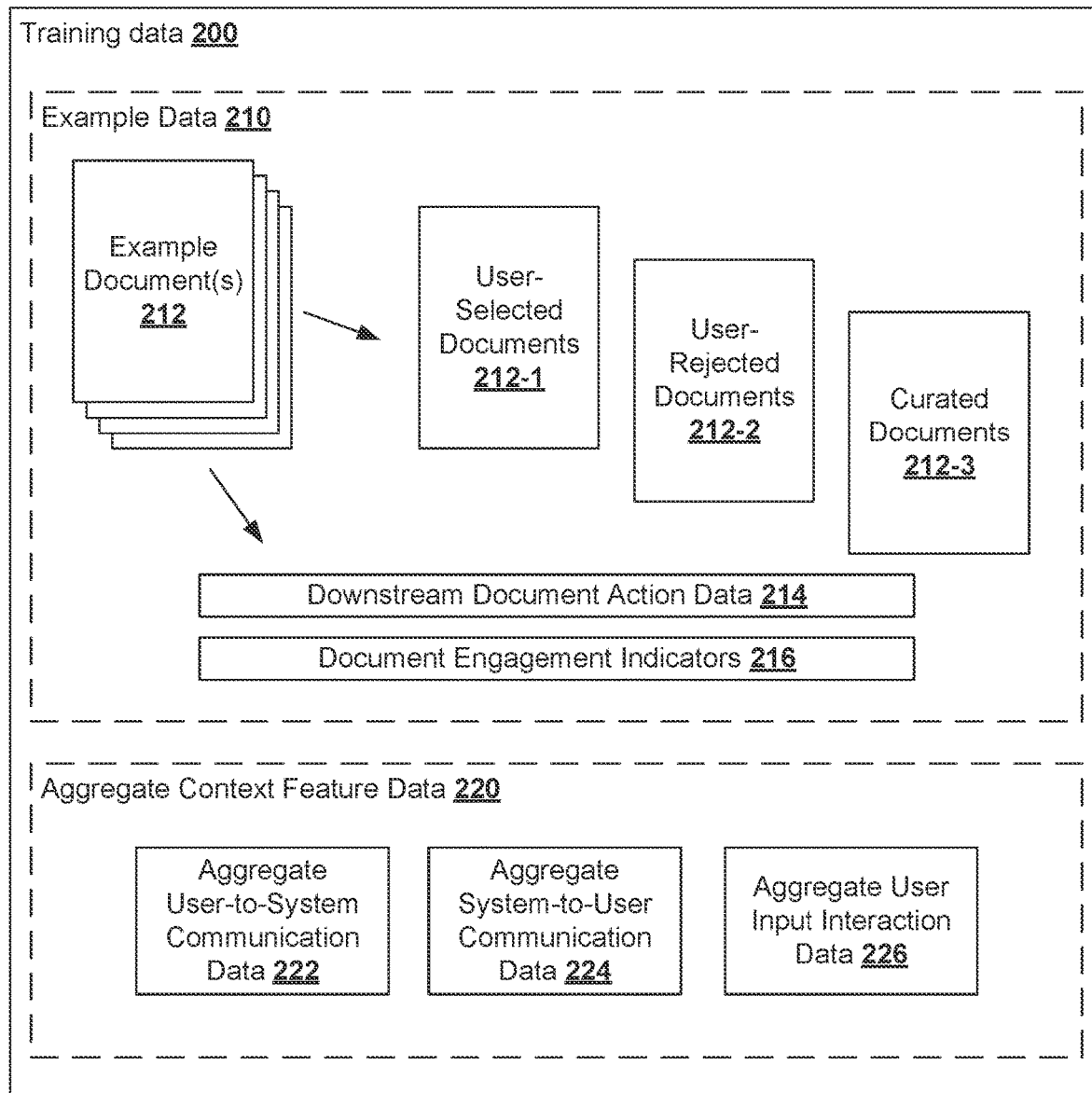
FIG. 2 is a block diagram of example training data for training a machine-learned content generation model for contextual structured resource completion according to some implementations of the present disclosure.

FIG. 2 is a block diagram of example training data 200 for training a machine-learned content generation model 102, model control system 104, or both for contextual structured resource completion according to some implementations of the present disclosure. Training data 200 can be the same as, included in, or different from training data 106. Training data 200 can include example structured resources. Training data 200 can include example documents output from a structured resource.

Training data 200 can include document data 210. Document data 210 can include example documents 212. Example documents 212 can include substantially any type of document from substantially any source. Example documents 212 can be obtained from public sources, such as open archives of documents. Example documents 212 can include user-selected documents 212-1, user-rejected documents 212-2, curated documents 212-3, and the like. Example documents 212 can be positive or negative examples, or examples with both positive and negative features. Example documents 212 can be the same or different type of document. Other publicly available and distributed example documents can be incorporated into example documents 212.

Example documents 212 can be complete documents or partial documents. Partial documents can include content strings. Content strings can be associated with respective categories. For instance, categories of content strings can be associated with sections of a document (e.g., sections of a resume).

User-selected documents 212-1 can include documents generated by structured resource completion system 100 and accepted or confirmed by the user. User-selected documents 212-1 can be partial documents corresponding to parts of the respective document that were generated by structured resource completion system 100 and subsequently selected or approved by the user.

User-selected documents 212-1 can include documents or portions thereof that are uploaded or otherwise submitted by a user to structured resource completion system 100. User-selected documents 212-1 can include documents or portions thereof that users have engaged with, "favorited," saved, or otherwise marked or selected. For instance, structured resource completion system 100 or another system can host or display documents. User-selected documents 212-1 can be obtained from, for instance, high performing documents on the system (e.g., based on interest, most shares, most downloads, etc.).

User-rejected documents 212-2 can include natural language content generated by structured resource completion system 100 and rejected or ignored by the user. User-rejected documents 212-2 can be partial documents corresponding to document portions that were not selected or approved by the user. User-rejected documents 212-2 can include synthesized documents that inject a rejected portion of generated content into the document along with other portions that were selected. For instance, in a three-section document, a rejected second section could be combined with an accepted first and third sections to generate a user-rejected document 212-2. In this manner, for instance, user rejections can be placed in the context of the WIP structured resource.

Curated documents 212-3 can include documents or document portions compiled as exemplars (positive or negative examples) for guiding the training of the machine-learned content generation model(s) 102. Curated documents 212-3 can be collected or created by human selection. For instance, experts in a domain of documents can be determined. The experts can indicate one or more example documents 212.

Document data 210 can optionally include feedback signals associated with example documents 212. Document data 210 can include downstream document action data 214 and document engagement indicators 216. Document data 210 can include feedback signals that are not explicitly associated with a particular example document 212.

Downstream document action data 214 can include feedback 140 obtained from downstream system(s) 130. Downstream document action data 214 can include data descriptive of actions taken or recorded by downstream system(s) 130. For instance, a recruiting decision can be recorded by downstream system(s) 130 (e.g., recording a decision to schedule an interview for a candidate associated with a document, a decision not to schedule an interview, a decision to hire, a decision not to hire, a decision to save for later review, etc.). The recorded decision can be added to training data 200.

Downstream document action data 214 can include context features associated with the handling of a document by the downstream system(s) 130. Context features can include a time of review, a time from submission to initial review, a time before an action is taken with respect to the document, whether any action was taken within a specified threshold, etc.

Downstream system(s) 130 can send downstream document action data 214 to structured resource completion system 100. For instance, downstream system(s) 130 can send the data to structured resource completion system 100 according to a data sharing agreement. Downstream system(s) 130 can communicate with structured resource completion system 100 (e.g., over a network). Downstream system(s) 130 can provide example documents or downstream document action data 214 directly to structured resource completion system 100 or to an intermediary system accessible by the structured resource completion system 100. Downstream system(s) 130 can provide example documents or downstream document action data 214 to a third-party database, and the structured resource completion system 100 can obtain the example documents or downstream document action data 214 from the third-party database.

Downstream document action data 214 can be provided to structured resource completion system 100 by users. Users of structured resource completion system 100 (e.g., users of an endpoint device 110) can upload or input downstream document action data 214 to structured resource completion system 100, or a database associated therewith or accessible thereby. A user that has generated a document using structured resource completion system 100 can later update a user account to include downstream document action data 214 for the generated document.

Document engagement indicators 216 can include one or more signals associated with interest in a respective document. Document engagement indicators 216 can include performance metrics or popularity metrics of a respective document. Document engagement indicators 216 can include a count of a number of times that a document has been viewed, clicked, shared, linked to, downloaded, favorited, marked, or otherwise distinguished (e.g., when hosted or provided from downstream system(s) 130, or other systems). Document engagement indicators 216 can be determined explicitly or implicitly. Document engagement indicators 216 can be measured or predicted or otherwise estimated (e.g., using statistical techniques, machine-learned impression models, etc.).

Document engagement indicators 216 can be obtained from documents hosted in association with the structured resource completion system 100 or in association with other system(s). Document engagement indicators 216 can be obtained from web pages hosting documents (or portions thereof). Document engagement indicators 216 can be based on explicit or implicit signals. For instance, an explicit signal can be a number of "likes" or other features directly related to a given document. An implicit signal can be a number of times a blog post is linked to that describes the given document.

Training data 200 can include aggregate context feature data 220. Aggregate context feature data 220 can include context data aggregated over a sample of sessions (e.g., communication sessions 112) to capture macro trends in interactions with the structured resource completion system 100. Aggregate context feature data 220 can form a baseline against which context data 108 can be compared for classifying or otherwise interpreting context data 108 in view of population-level trends. Aggregate context feature data 220 can be privatized such that sensitive user data can be obscured (e.g., within a specified privacy budget, such as by using differential privacy techniques).

Aggregate context feature data 220 can include aggregate user-to-system communication data 222. Aggregate user-to-system communication data 222 can include data describing interactions with, for instance, a user support portal. Aggregate user-to-system communication data 222 can include user complaint data or support tickets associated with structured resources. For instance, aggregate user-to-system communication data 222 can include requests for refunds describing a lack of user dissatisfaction with the quality of a produced structured resource. Such data can be respectively indexed with a set of generated documents or features extracted therefrom. In this manner, aggregate user-to-system communication data 222 can provide error signals (e.g., noisy error signals) associated with generated documents.

Aggregate context feature data 220 can include aggregate system-to-user communication data 224. Aggregate system-to-user communication data 224 can include system responses to aggregate user-to-system communication data 222. Aggregate system-to-user communication data 224 can include, for instance, messages indicating a refund associated with a complaint related to a structured resource. In this manner, aggregate system-to-user communication data 224 can provide verification signals (e.g., noisy verification signals) of suboptimal performance associated with generated structured resources.

Aggregate context feature data 220 can include aggregate user input interaction data 226. Aggregate user input interaction data 226 can include data descriptive of macro trends in user inputs. Macro trends in user inputs can include trends in input instructions, requests, or corrections (e.g., common phrases used when invoking particular functionality). Macro trends in user inputs can include trends in selection habits using selectable interface(s) of structured resource completion system 100 (e.g., a proclivity to only select from among first three ranked suggestions and not below, etc.). Aggregate user input interaction data 226 can provide an association between input data and subsequent selection(s). By indicating the selected generated content associated with a given input, aggregate user input interaction data 226 can thus provide unsupervised training signals for improving the understanding of the inputs.

Figure 3:
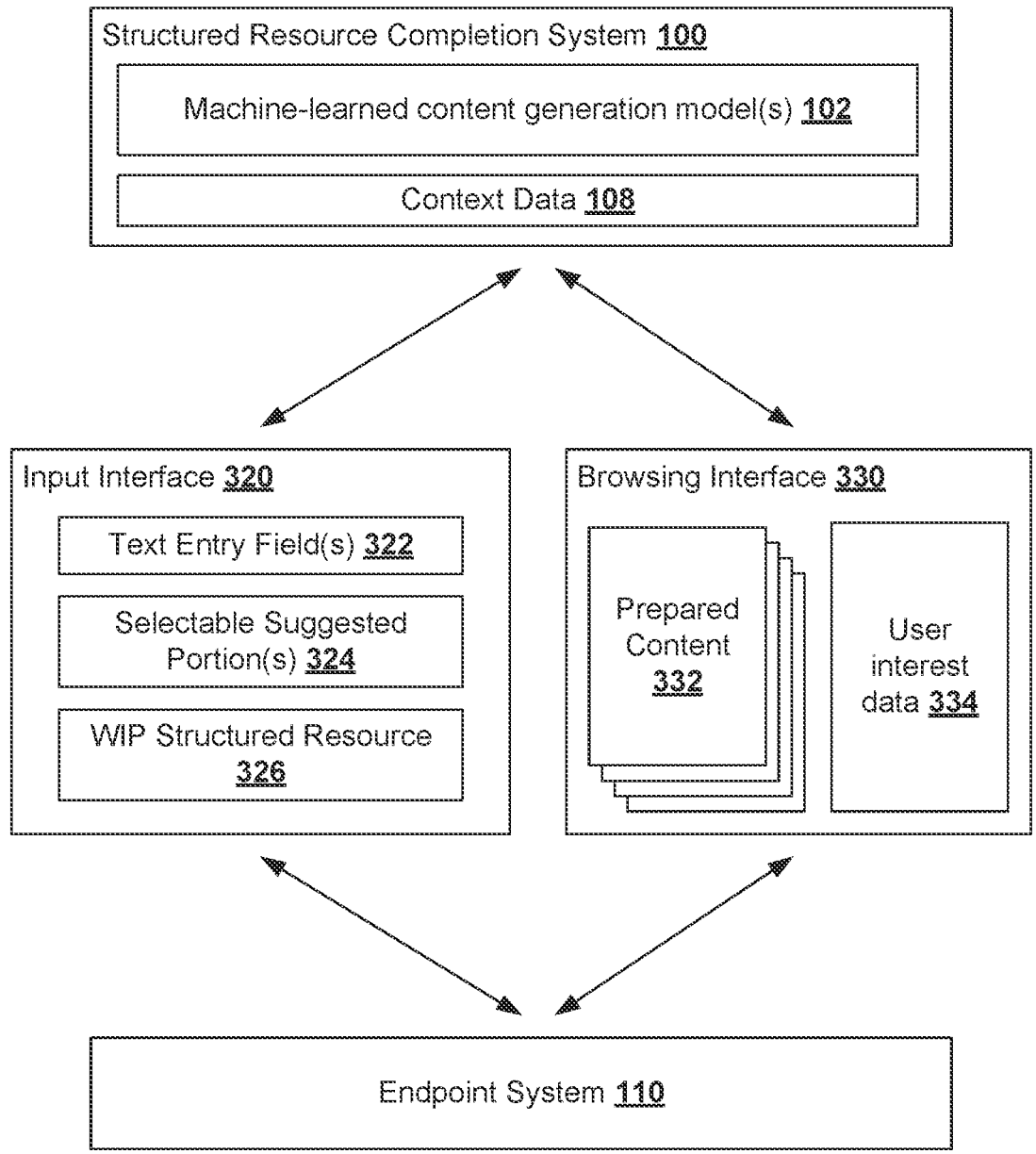
FIG. 3 is a block diagram of example interfaces for interfacing with an example structured resource completion system according to some implementations of the present disclosure.

FIG. 3 is a block diagram of example interfaces for interfacing with an example structured resource completion system according to some implementations of the present disclosure. A structured resource completion system 100 can implement a machine-learned content generation model 102 that processes various inputs in view of context data 108. An endpoint system 110 can implement an input interface 320. The input interface 320 can include text entry fields 322 for inputting inputs for the machine-learned content generation model 102. The input interface 320 can include selectable suggested portion(s) 324 output by the machine-learned content generation model 102 in response to the inputs provided in the text entry field(s) 322. Based on selections to the selectable suggested portion(s) 324, a WIP structured resource 326 rendered in the input interface 320 can be updated. The structured resource completion system 100 can provide, through a browsing interface 330, prepared content 332.

Input interface 320 can be or include a structured input interface configured for inputting various types of data. Input interface 320 can be implemented as a web page or web-based application. Input interface 320 can be implemented in a native application executing on endpoint system 110. Input interface 320 can be or include a graphical user interface. A graphical user interface can render visible content on a display device associated with endpoint system 110. The graphical user interface can be navigated using one or more user inputs. Input interface 320 can be or include an audio user interface. An audio user interface can render audible content on an audio driver device associated with endpoint system 110. The audio user interface can be a conversational interface configured to detect written or spoken natural language inputs and process commands input thereby.

Input interface 320 can include text entry fields 322. Text entry fields 322 can be configured to receive natural language inputs. Text entry fields 322 can be configured to pass text inputs to a data structure for communicating the input data to structured resource completion system 100.

Text entry field(s) 322 can include a free form text input field. Text entry field(s) 322 can be configured for a user to request generated content, to provide examples of desired content (e.g., an example job title, description, etc. for the system to improve upon), etc. Other entry field(s) can be included in the interface, such as dropdown menus or buttons for selecting suggested inputs.

Text entry field(s) 322 can include structured arrangements of input field(s). Text entry field(s) 322 can correspond to questions or prompts presented to the user to guide the user's inputs to the field(s). Questions or prompts can call for different types of information in different fields. In this manner, for instance, input(s) to the respective field(s) can be associated with the data types called for in the questions or prompts. For instance, inputs to a field corresponding to a question regarding work experience can be associated with a user's work experience.

Text entry field(s) 322 can include multiple input fields respectively associated with different sections of a structured resource (e.g., an educational section of a resume, a work experience section of a resume, a qualifications section of a resume, etc.). The multiple input fields can be used, for example, by a user to provide details of the user's desired content (e.g., factual content, such as a listing of educational history, job history, qualifications, etc.). The structured resource completion system 100 can receive the contents of the multiple input fields and generate content for the respective sections of the structured resource. The structured resource completion system 100 can generate the content for each respective section in view of the other input fields for the other sections. The structured resource completion system 100 can iteratively generate content, such that a current iteration of generated content for a given section can be generated in view of generated content of the other section(s) generated in a prior iteration.

Data from text entry field(s) 322 can be input directly to machine-learned content generation model 102. Data from text entry field(s) 322 can be used to generate (e.g., using machine-learned content generation model 102, using another machine-learned model, or using a heuristic, template, or other technique) an intermediate input that is then input to machine-learned content generation model 102. For instance, data from text entry field(s) 322 can be used to populate fields in a predetermined instruction that is input to machine-learned content generation model 102. For instance, a predetermined instruction for machine-learned content generation model 102 can include a prompt or other input to machine-learned content generation model 102 that provides context for a request for generated content. For instance, an input to machine-learned content generation model 102 can include data from text entry field(s) 322 as background information and can include a request for a portion of national language content generated in view of the provided background information.

Text entry field(s) 322 can receive input data from an import system configured to process input structured resources. For instance, documents can be input to the import system for parsing to extract salient data from the documents for input to the text entry field(s) 322. A document image or other file can be parsed (e.g., with optical character recognition, etc.) to obtain the data within. The data parsed from the document can be passed to one or more text entry field(s) 322. The data parsed from the document can be classified (e.g., by relevant section) and passed to one or more corresponding text entry field(s) 322. The data parsed from the document can be classified by one or more machine-learned models.

Structured resource completion system 100 can process the input(s) received from the text entry field(s) 322 and return generated content for the user's review. Input interface 320 can provide one or more selectable suggested portion(s) 324. Selectable suggested portion(s) 324 can include one or more candidate portions of content generated by structured resource completion system 100 for completing the WIP structured resource 326. Selectable suggested portion(s) 324 can be rendered to a user, and one or more portion(s) can be selected by a user input. The one or more selected portion(s) can be added to the WIP structured resource 326.

Selection of one or more selectable suggested portion(s) 324 can trigger computation of other generated content. For instance, selection of portion(s) for one section of a structured resource can trigger generation of updated suggestions for the other sections. Input interface 320 can present a number of selectable suggested portion(s) 324 for multiple sections, and input interface 320 can update the presentation in real time as various suggestions are selected.

Input interface 320 can include a selectable input element indicating that no suggestions are satisfactory. Input interface 320 can include a selectable input element that triggers regeneration of some or all of the suggestions.

Selectable suggested portion(s) 324 can be rendered as a list of options in a menu. Selectable suggested portion(s) 324 can be rendered within the context of previously-entered portions of the structured resource. Selectable suggested portion(s) 324 can be rendered within a depiction of a document generated as of a current status of the structured resource.

Selectable suggested portion(s) 324 can include a word, a phrase, a sentence, a paragraph, etc. Selectable suggested portion(s) 324 can be related to the same data type (e.g., for the same section of a structured resource, such as output resource 120). Selectable suggested portion(s) 324 can be related to different data types (e.g., for different sections of a structured resource, such as output resource 120).

Selectable suggested portion(s) 324 can be associated with an index or identifier. For instance, in an ordered presentation of selectable suggested portion(s) 324, an index can correspond to a position within the ordering of a particular selectable suggested portion. In this manner, suggestions that are selected can be registered with respect to suggestions that are not selected. Suggestions that are not selected (e.g., suggestions coming before the selected suggestion, suggestions coming after the selected suggestion) can be used as feedback to update context data associated with the user. For instance, suggestions appearing before the eventually selected suggestion can be treated as negative examples. For instance, a negative example can be a suggestion seen by the user and not selected. Although the user might not provide explicit feedback about why any particular suggestion was not selected, using the passed-over suggestions as negative examples can provide for fine tuning a machine-learned model to extract meaningful trends from the negative examples, thereby capturing and responding to latent or implicit user preferences.

WIP structured resource 326 can be or include a depiction or rendering of the current or work-in-progress state of the structured resource being completed. WIP structured resource 326 can include a depiction of a formatted document, with information from the structure of the current contents of the structured resource mapped to respective portions of a document page. WIP structured resource 326 can be updated in real time as suggested content is selected for inclusion in the WIP structured resource 326. WIP structured resource 326 can be edited directly. Directly editing WIP structured resource 326 directly can include a user manually selecting one or more passages of text within a rendering of a document page based on WIP structured resource 326 and providing edits. Such edits can be used, for instance, for generating further suggestions.

Selectable suggested portion(s) 324 can be rendered within WIP structured resource 326. For instance, WIP structured resource 326 can include a portion of existing text (e.g., from prior inputs, prior suggestions, etc.). A selectable suggested portion can be rendering seamlessly within or appended to the portion of existing text. An input can be configured for confirming the selectable suggested portion. An input can be configured for cycling or scrolling between different selectable suggested portions in the same position (e.g., a swipe or scroll gesture for cycling through options for the next sentence in a paragraph). The selectable suggested portion can be rendered in the same format as the existing text. The selectable suggested portion can be rendered in a different format as the existing text. The selectable suggested portion can be, for instance, rendered as "greyed out" or otherwise indicate its unconfirmed status until the user confirms. Confirmation can, for instance, be input by selecting (e.g., with a cursor) and editing the text within the selectable suggested portion. After being edited, the edited selectable suggested portion can be determined to be confirmed for inclusion in the structured resource, such that the edited selectable suggested portion thus forms a portion of the existing text for future iterations.

Input interface 320 can provide context data 108 for processing along with explicit inputs for generation of suggested content. For instance, context data 108 can contain a prefix for prompting the machine-learned content generation model(s) 102 to generate natural language content. Context data 108 can be obtained from the structure of selectable suggested portion(s) 324. Selectable suggested portion(s) 324 can be provided within the input interface 320 in an ordered or ranked presentation. The ordinal value of the selected portion can be included in the context data. The suggested portion(s) associated with higher-ranked ordinal values can be included in the context data. In this manner, context data 108 can include generated content that the user has rejected (e.g., by selecting other portion(s)). The generated content rejected by the user can be used to steer machine-learned content generation model(s) 102 toward suggestions aligning with the user's preferences.

In an example user experience, a user can initialize input interface 320 for generating a structured resource. For instance, a user can input into text entry field(s) 322 an initial work experience title or description. Structured resource completion system 100 can generate a number of suggestions for natural language content associated with the work experience title or description. The suggestions can be presented as individual selectable suggested portion(s) 324. The user can select at least one of the selectable suggested portion(s) 324 for inclusion in the structured resource. Based on the user's selection, WIP structured resource 326 can update to reflect the inclusion of the selected portion. Based on the user's selection, additional suggestions can be generated by structured resource completion system 100. The additional suggestions can be generated by structured resource completion system 100 based on an instruction input to the machine-learned content generation model(s) 102 (e.g., a prompt, a latent vector, etc.). The instruction can be customized based on the user's selection, the user's past selections, the user's current session history, the user's past session histories, portions of the user's profile information (e.g., such as prior-entered biographical information), etc. For instance, a prompt for the machine-learned content generation model(s) 102 can be based on or include data descriptive of any one or more of the user's selection, the user's past selections, the user's current session history, the user's past session histories, portions of the user's profile information (e.g., such as prior-entered biographical information), other portion(s) of the structured resource, etc. Thus portions of the structured resource can be generated in view of prior portions of the structured resource.

Browsing interface 330 can provide context data 108 for processing with explicit inputs for generation of suggested content. Browsing interface 330 can be implemented on or by endpoint system 110, such as in web browser or natively in an application. Browsing interface 330 can be associated with structured resource completion system 100. Browsing interface 330 can be associated with a third-party server (e.g., a web server).

Browsing interface 330 can be used to interact with networked resources accessible by endpoint system 110. Networked resources can include active content (e.g., interactive content, executable content, such as applications, applets, etc.) or passive content (e.g., recorded content, such as textual content, audio content, video content, etc.). Networked resources can include prepared content 332. For instance, a user can peruse prepared content 332, and the user's activity during one or more sessions can be recorded in user interest data 334. Context data 108 can be based on user interest data 334.

Prepared content 332 can include web pages, articles, documents, etc. that users can access. Prepared content 332 can be associated with various features and characteristics, such as topics, writing styles, etc. Prepared content 332 can be user-generated, curated, etc. User interest data 334 can be based on user engagement with prepared content 332. User engagement can include views, clicks, shares, favorites, likes, downloads, etc. In this manner, for instance, context data 108 can be customized to reflect a user's preferences, styles, and the like.

Figure 4:
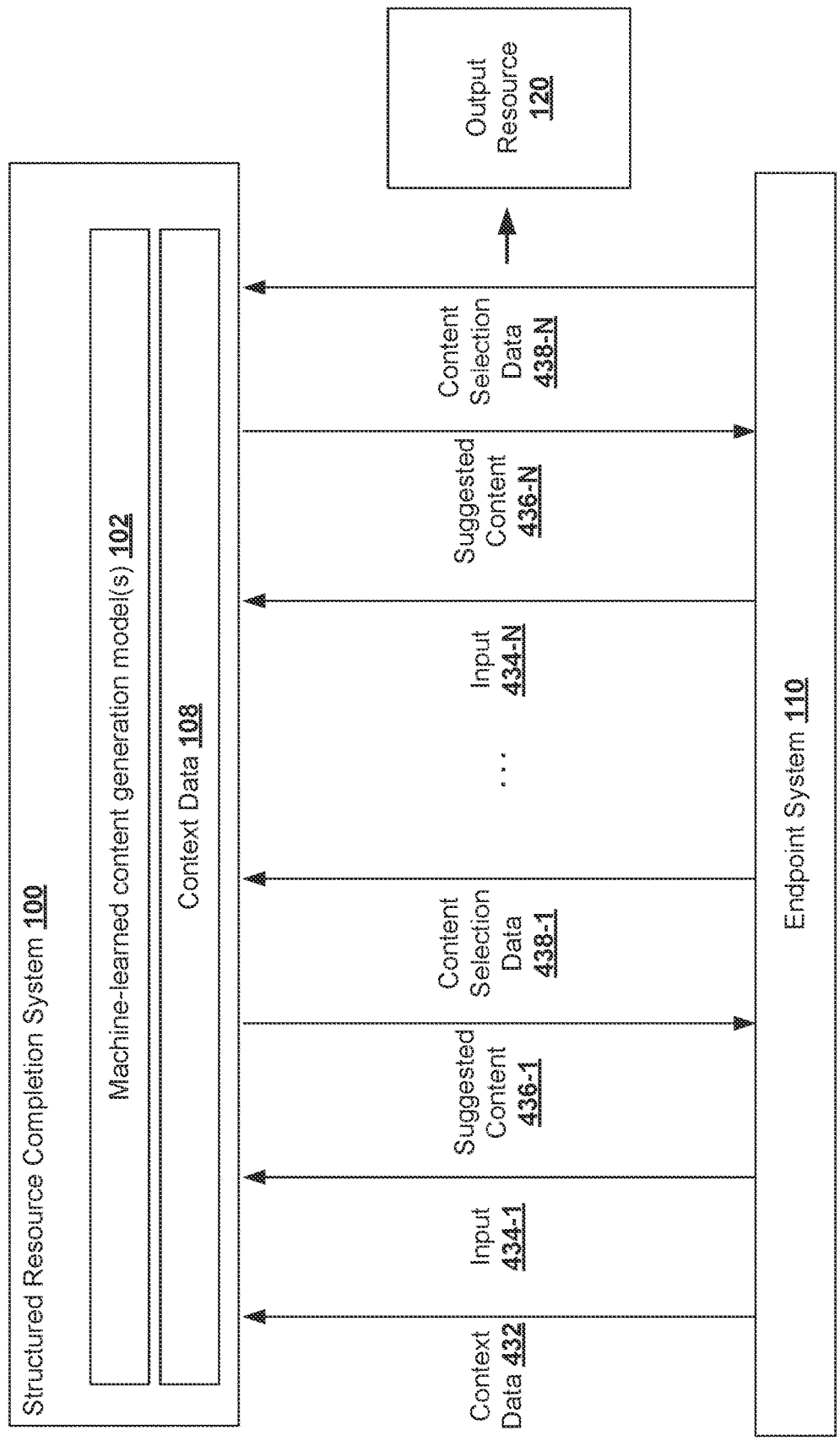
FIG. 4 is a block diagram of an example communication session for contextual structured resource completion according to some implementations of the present disclosure.

FIG. 4 is a block diagram of an example communication session (e.g., communication session 112) for contextual structured resource completion according to some implementations of the present disclosure. A structured resource completion system can implement one or more machine-learned content generation model(s) 102 in view of context data 108 to generate, cooperatively with inputs from an endpoint system 110, an output resource 120.

A communication session can include transmittal of context data 432 to structured resource completion system 100 from endpoint system 110. Context data 432 can include new or updated context data obtained at endpoint system 110. Context data 432 can be configured as an update to context data 108. Context data 108 can be persisted across sessions and receive session updates in context data 432.

A communication session can include transmittal of an input 434-1 to structured resource completion system 100. The input 434-1 can include a textual input from a user of the endpoint system 110. Input 434-1 can include data received as inputs to text entry field(s) 322 of an input interface 320.

Structured resource completion system 100 can process the input 434-1 in view of context data 108 to generate suggested content 436-1. Suggested content 436-1 can include one or more candidate portions of natural language content. Suggested content 436-1 can include candidates presented as one or more selectable suggested portion(s).

A user can provide an input to endpoint system 110 to indicate selection of all or part of suggested content 436-1. Content selection data 438-1 can describe the content selection. The selected content can be added to the current state of a WIP structured resource. Content selection data 438-1 can include data descriptive of the selection and context data associated therewith. Content selection data 438-1 can include data descriptive of unselected candidates to steer structured resource completion system 100 toward aligning with the user's preferences. In this manner, for instance, content selection data 438-1 can update context data 108.

This cycle can be repeated. For instance, after one or more iterations, an input 434-N can be provided to structured resource completion system 100. Based on the input 434-N, suggested content 436-N can be generated. One or more portions of suggested content 436-N can be selected, the selection reflected in content selection data 438-N. With insertion of the selected generated content into the structured resource, output resource 120 can be obtained that includes the iteratively generated content.

In an example user experience, a user can indicate a desired type of output resource. For instance, the user can input a selection of a first type of output resource associated with relatively short form natural language content (e.g., a resume with short bullets or summary points). The user can input a selection of a second type of output resource associated with longer form natural language content (e.g., a cover letter with narrative passages of text).

In an example user experience, the user can indicate a desired goal for a particular version of the structured resource. For instance, a desired goal for a cover letter or resume can include a desired recipient (e.g., a desired recipient of the letter or resume), a desired entity associated with the recipient (e.g., a company associated with the recipient), or a desired subject for the letter or resume (e.g., a desired job position for which the user is applying).

The indicated type or resource or goal for the resource can be included in context data 432. Instructions or inputs to the machine-learned content generation model(s) 102 can be configured based on the indicated goal. For instance, a prompt can be constructed for the machine-learned content generation model(s) 102 based on the context data 432, 108. For instance, a prompt can be constructed to guide the output of the machine-learned content generation model(s) 102 based on the indicated type or goal to generate suggested content.

Figure 5:
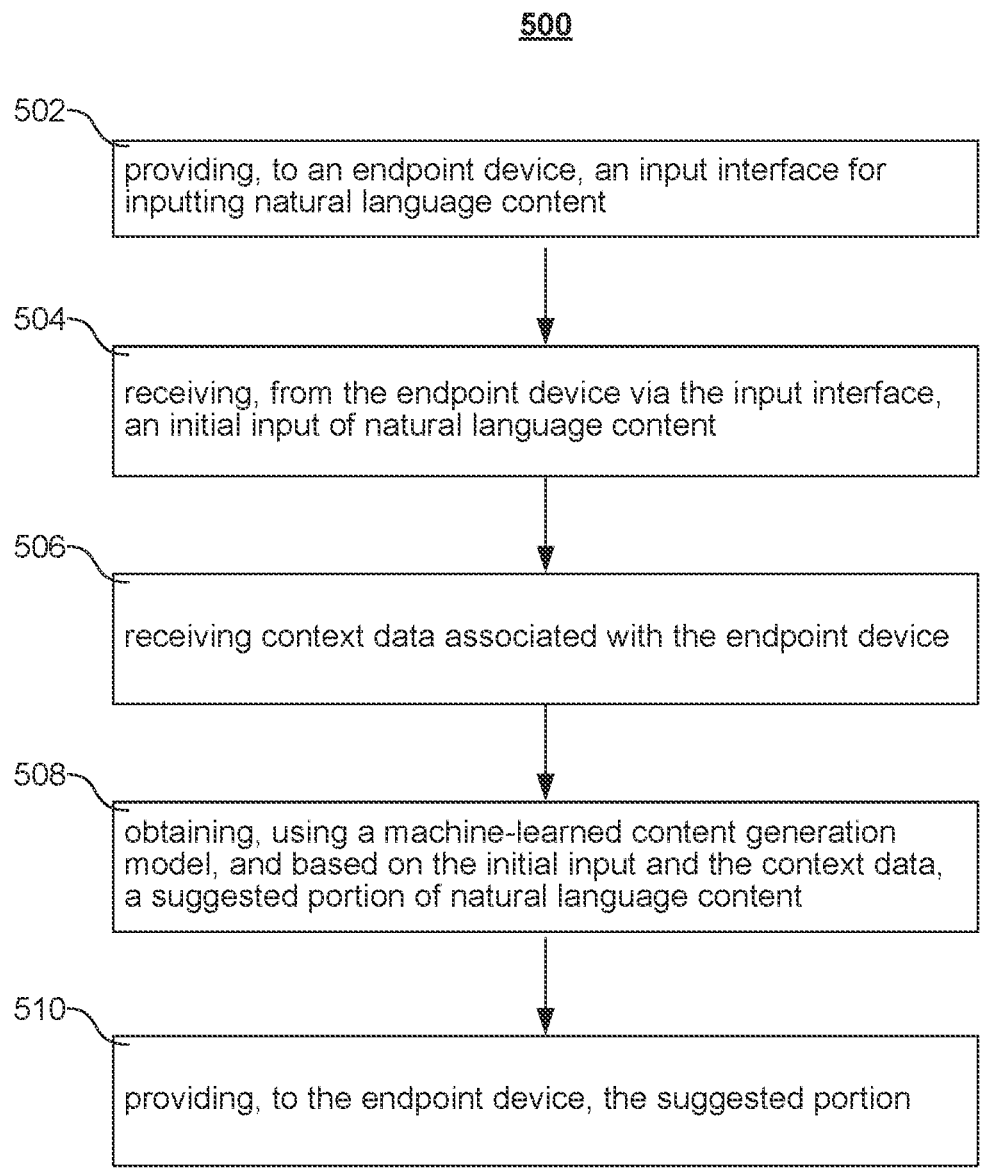
FIG. 5 is a flowchart of an example method for contextual structured resource completion according to some implementations of the present disclosure.

FIG. 5 depicts a flowchart of an example method 500 for performing contextual structured resource completion according to aspects of the present disclosure. One or more portion(s) of the example method 500 can be implemented by a computing system that includes one or more computing devices such as, for example, the computing systems described with reference to the other figures (e.g., structured resource completion system 100, endpoint system 110, downstream system(s) 130, structured resource completion system 100, endpoint system 110, structured resource completion system 100, endpoint system 110, a system of FIG. 6, etc.). Each respective portion of the example method 500 can be performed by any (or any combination) of one or more computing devices. Moreover, one or more portion(s) of the example method 500 can be implemented on the hardware components of the device(s) described herein (e.g., as in FIGS. 1, 2, 3, 4, 6, etc.), for example, for contextual structured resource completion tasks. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 5 is described with reference to elements/terms described with respect to other systems and figures for exemplary illustrated purposes and is not meant to be limiting. One or more portions of example method 500 can be performed additionally, or alternatively, by other systems.

At 502, example method 500 can include providing, to an endpoint device, an input interface for inputting natural language structured resource content. An endpoint device can be or be part of endpoint system 110, etc. The input interface can be a web-based interface, a native application-based interface, or combinations thereof. For instance, input interface 320 can be provided to or otherwise obtained by an endpoint device. Input interface 320 can be obtained from a structured resource completion system (e.g., structured resource completion system(s) 100, etc.). Input interface 320 can be obtained from an application distribution platform (e.g., a mobile device application distribution platform).

Example method 500 can include providing, to the endpoint device, a structured interface for assembling natural language content from a plurality of candidate suggested portions of natural language content. For instance, a structured interface can include one or more text entry field(s) 322 or other input elements for inputting data. The input fields or elements can correspond to desired sections of a WIP structured resource. The structured interface can map to the structure of the WIP structured resource.

At 504, example method 500 can include receiving, from the endpoint device via the input interface, an initial input of natural language content. The initial input can include an instruction or request for content for completing at least part of the structured resource. For instance, the initial input can be a summary of or list of content for a section of the structured resource. The initial input can be based on a user's manual input. The initial input can be based on an automatic parsing of an imported structured resource. The initial input can be or include, for instance, input 434-1.

At 506, example method 500 can include receiving context data associated with the endpoint device. Context data can include context data 108, etc. In example method 500, the context data can include session data descriptive of user engagement with networked resources related to the structured resource. Networked resources can include prepared content 332. Session data can include user interest data 334.

At 508, example method 500 can include obtaining, using a machine-learned content generation model, and based on the initial input and the context data, a suggested portion of natural language content. The machine-learned content generation model can be or include machine-learned content generation model(s) 102, machine-learned content generation model(s) 102, machine-learned content generation model(s) 102, etc. The suggested portion can include a restatement or expansion of the initial input in a manner configured to increase the functionality of the structured resource at achieving its intended end (e.g., positively affecting recruiting decisions). The suggested portion can be or include suggested content 436-1.

At 510, example method 500 can include providing, to the endpoint device, the suggested portion. The suggested portion can be provided by sending the suggested portion to the endpoint device. The suggested portion can be rendered in association with a selectable input element. The selectable input element can be configured to cause, when selected, the suggested portion to be included in the WIP structured resource. The completed structured resource can include output resource 120.

Example method 500 can include receiving, from the endpoint device, a response to the generated suggested portion. In example method 500, the response can be descriptive of an input selecting the suggested portion. The response can be or include content selection data 438-1.

Example method 500 can include obtaining, using the machine-learned content generation model, and based on the initial input and the context data, a plurality of suggested candidate portions of natural language content, the plurality of candidate suggested portions including the suggested portion. In example method 500, the response can indicate an input selecting the suggested portion. In example method 500, the response can indicate an input selecting a suggested candidate portion other than the suggested portion.

In example method 500, context data can include data indicating responses to the generated suggested portion(s) (e.g., corresponding to input(s) selecting the generated suggested portion). Context data can include data indicating responses to other generated suggested portion(s) (e.g., corresponding to input(s) selecting a suggested candidate portion other than the suggested portion). Context data can include data indicating responses to previously-generated suggested portions.

In example method 500, the context data can be updated based on the response. In example method 500, the context data can be updated based on one or more candidate suggested portions that were provided to the endpoint device but were not selected. In example method 500, the one or more candidate suggested portions can be presented in an ordered interface. The one or more candidate suggested portions can be presented as ordered before the suggested portion (e.g., the suggested portion that was selected).

Example method 500 can include obtaining, using the machine-learned content generation model, and based on the updated context data, an additional suggested portion of natural language content. For instance, an additional suggested portion can be or include suggested content 436-N. The additional suggested portion can be generated responsive to an additional input, such as input 434-N.

In example method 500, obtaining, using the machine-learned content generation model, and based on the initial input and the context data, the suggested portion can include: providing, to the machine-learned content generation model, an intermediate input based on the initial input and the context data. The intermediate input can include an input constructed from the initial input as modified by the context data. One or more machine-learned models can receive the initial input and the context data and generate an intermediate input for feeding to the machine-learned content generation model(s). The intermediate input can include a projection of the initial input as transformed by the context data. The intermediate input can include a prompt or instruction generated by a first machine-learned content generation model for prompting or instructing a second machine-learned content generation model to generate one or more suggested portion(s). The intermediate input can include a natural language instruction or request for input to a large language model (e.g., a prompt for prompting a machine-learned model). In example method 500, the intermediate input can include a learned embedding of at least part of the context data. In example method 500, the intermediate input to the machine-learned content generation model can be generated or adjusted based on a training corpus related to the structured resource.

In example method 500, a user can indicate a desired type of output resource. In example method 500, a user can input a selection of a first type of output resource associated with short form natural language content. In example method 500, a user can input a selection of a second type of output resource associated with long-form natural language content. In example method 500, a user can indicate a desired goal for a particular version of the output resource. In example method 500, a desired goal can include a desired recipient of the output resource, a desired entity associated with the recipient of the output resource, or a desired subject for the output resource.

In example method 500, a type of resource or goal for the resource can be indicated in the context data. In example method 500, a prompt can be constructed for the machine-learned content generation model(s) based on the context data. In example method 500, a prompt can be constructed to customize the output of the machine-learned content generation model(s) based on the indicated type or goal to generate suggested content.

In example method 500, instructions or inputs to the machine-learned content generation model(s) can be configured based on the indicated type or goal. For instance, a user can input (e.g., using an endpoint system, such as endpoint system 110) a type of document desired to be output from the system (e.g., a document output by a structured resource completion system 100). A user can input, for instance, a resume type, a cover letter type, etc. Based on the indicated type of document, different instructions can be generated for input to the machine-learned content generation model(s) (e.g., generated by a model control system 104 for machine-learned content generation model(s) 102, etc.).

In example method 500, the machine-learned content generation model can be hosted on a third-party server, and the input interface can be served from a first-party server.

In example method 500, the machine-learned content generation model can be fine-tuned on a training corpus related to the structured resource.

In example method 500, the suggested portion can be obtained based on action data (e.g., feedback 140, downstream document action data 214, etc.) received from one or more downstream systems (e.g., downstream system(s) 130) that receive documents generated by the machine-learned content generation model.

Figure 6:
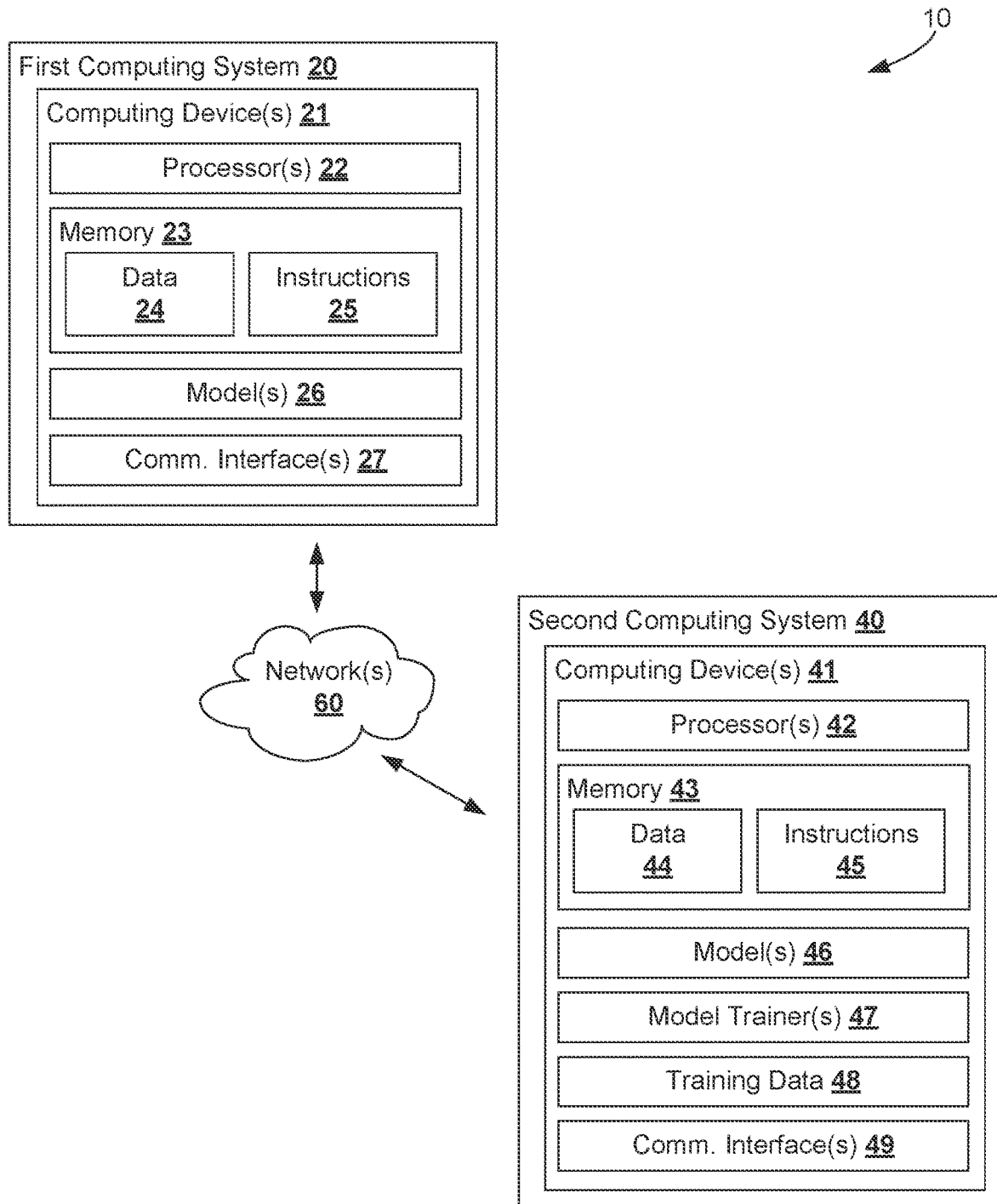
FIG. 6 is a block diagram of an example computing system for performing according to some implementations of the present disclosure.

FIG. 6 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing system 40 can implement one or more of the systems, operations, or functionalities described herein for contextual structured resource completion (e.g., structured resource completion system 100, structured resource completion system 100, structured resource completion system 100, model control system 104, endpoint system 110, endpoint system 110, endpoint system 110, downstream system 130, etc.).

In some implementations, the first computing system 20 can perform the operations and functions as described herein. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. Memory 23 can include one or more non-transitory computer-readable storage media, such as RAM, ROM, EEPROM, EPROM, one or more memory devices, flash memory devices, etc., and combinations thereof.

Memory 23 can store information that can be accessed by the one or more processors 22. For instance, memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, context data 108, context data 108, context data 108, training data 106, training data 200, initial inputs, intermediate inputs, suggested portions, documents, or any data or information described herein. In some implementations, the first computing system 20 can obtain data from one or more memory device(s) that are remote from the first computing system 20.

Memory 23 can store computer-readable instructions 25 that can be executed by the one or more processors 22. Instructions 25 can be software written in any suitable programming language or can be implemented in hardware.

Additionally, or alternatively, instructions 25 can be executed in logically or virtually separate threads on the processor(s) 22.

For example, memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein. For example, operations can include implementing contextual structured resource completion (e.g., as described herein).

In some implementations, the first computing system 20 can store or include one or more models 26. In some implementations, the models 26 can be or can otherwise include one or more machine-learned models (e.g., a machine-learned content generation model, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more transformer models for implementing contextual structured resource completion according to example aspects of the present disclosure.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in memory 23. The first computing system 20 can then use or otherwise implement the models 26 (e.g., by the processors 22).

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. Memory 43 can include one or more non-transitory computer-readable storage media, such as RAM, ROM, EEPROM, EPROM, one or more memory devices, flash memory devices, etc., and combinations thereof.

Memory 43 can store information that can be accessed by the one or more processors 42. For instance, memory 43 (e.g., one or more non-transitory computer-readable storage media, memory devices, etc.) can store data 44 that can be obtained. The data 44 can include, for instance, context data 108, context data 108, context data 108, training data 106, training data 200, initial inputs, intermediate inputs, suggested portions, documents, or any data or information described herein. In some implementations, the second computing system 40 can obtain data from one or more memory device(s) that are remote from the second computing system 40.

Memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein.

In some implementations, the second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the model(s) 26 at the first computing system 20, the second computing system 40 can include one or more models 46. As examples, the model(s) 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. Example neural networks include Large Language Models (LLMs) and variants and components thereof. For example, the second computing system 40 can include one or more transformer models for implementing contextual structured resource completion according to example aspects of the present disclosure.

In some implementations, the second computing system 40 or the first computing system 20 can train one or more machine-learned models of the model(s) 26 or the model(s) 46 through the use of one or more model trainers 47 and training data 48. Training data 48 can include training data 106, training data 200. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include synthesized training data. In some implementations, the second computing system 40 can implement data synthesis operations (e.g., masking operations, corrupting operations, etc.) for obtaining the training data 48 or for implementing the model trainer(s) 47 for training or testing the model(s) 26 or the model(s) 46. By way of example, the model trainer(s) 47 can train one or more components of a machine-learned model through unsupervised training techniques using an objective function (e.g., costs, rewards, heuristics, constraints, etc.) based on training data obtained from a corpus of training data. In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train model(s) 26. For example, in some implementations, the first computing system 20 can include a computing system associated with a structured resource completion system. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 6 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from a structured resource completion system can instead be performed at the structured resource completion system itself, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

What is claimed is:

1. A computer-implemented method for contextual prediction of content for a document, the method comprising:
    providing, to an endpoint device, an input interface configured for receiving natural language content;
    receiving, from the endpoint device, an initial input of natural language content associated with the document, wherein the initial input is based on user interactions with the input interface;
    receiving context data associated with the endpoint device;
    populating, based on the initial input and the context data, fields in a predetermined natural language instruction to generate a populated predetermined natural language instruction;
    generating, using a machine-learned content generation model to process the populated predetermined natural language instruction, a suggested portion of natural language content that completes a portion of the document;
    providing, to the endpoint device, the suggested portion;
    receiving, from the endpoint device, a response descriptive of a selection, via the input interface, for including the suggested portion in the document; and
    updating a state of the document based on the response.

2. The computer-implemented method of claim 1, wherein the machine-learned content generation model processes a string comprising the populated predetermined natural language instruction.

3. The computer-implemented method of claim 2, wherein the string comprises at least a portion of the document.

4. The computer-implemented method of claim 1, comprising:
updating the context data based on the response.

5. The computer-implemented method of claim 4, comprising:
generating an instruction for input to the machine-learned content generation model to generate additional suggested portions, wherein the instruction comprises data descriptive of the selection;
generating, using the machine-learned content generation model to process the instruction an additional suggested portion of natural language content; and
providing, to the endpoint device, the additional suggested portion.

6. The computer-implemented method of claim 4, comprising:
generating, using the machine-learned content generation model and based on the initial input and the context data, a plurality of candidate suggested portions of natural language content, the plurality of candidate suggested portions comprising the suggested portion; and
providing, to the endpoint device, the plurality of candidate suggested portions.

7. The computer-implemented method of claim 6, wherein the input interface is configured to render the plurality of candidate suggested portions as selectable input elements in an ordered presentation.

8. The computer-implemented method of claim 7, wherein the suggested portion is ordered after at least one other candidate suggested portion.

9. The computer-implemented method of claim 8, wherein each respective candidate suggested portion of the plurality of candidate suggested portions corresponds to a respective index, wherein the respective index indicates a respective position within the ordered presentation.

10. The computer-implemented method of claim 6, wherein the context data is updated based on one or more candidate suggested portions of the plurality of candidate suggested portions, wherein the one or more candidate suggested portions are not associated with a selection, via the input interface, for including the one or more candidate suggested portions in the document.

11. The computer-implemented method of claim 8, wherein the context data is updated based on one or more candidate suggested portions ordered before the suggested portion in the ordered presentation.

12. The computer-implemented method of claim 1, wherein the machine-learned content generation model is fine-tuned on a training corpus related to the document.

13. The computer-implemented method of claim 1, wherein at least part of the predetermined natural language instruction is obtained from a training corpus related to the document.

14. The computer-implemented method of claim 1, wherein the suggested portion is generated based on action data received from one or more downstream systems that receive documents structured resources generated using the machine-learned content generation model.

15. The computer-implemented method of claim 1, wherein the populated predetermined natural language instruction comprises data descriptive of past inputs of a user.

16. The computer-implemented method of claim 3, wherein the string is generated based on a training corpus related to the document, wherein the training corpus comprises one or more documents accepted or confirmed by the user.

17. The computer-implemented method of claim 1, wherein the document comprises a plurality of sections, and wherein the method comprises:
generating a suggested portion for a first section the plurality of sections based on content associated with at least one other section of the plurality of sections.

18. The computer-implemented method of claim 17, comprising:
iteratively generating content using the machine-learned content generation model, such that a current iteration of generated content for a given section is generated based on generated content that was generated in a prior iteration.

19. A computing system, comprising:
one or more processors; and
one or more non-transitory computer-readable media storing instructions that are executable by the one or more processors to cause the computing system to perform operations, the operations comprising:
providing, to an endpoint device, an input interface configured for receiving natural language content;
receiving, from the endpoint device, an initial input of natural language content associated with a document, wherein the initial input is based on user interactions with the input interface;
receiving context data associated with the endpoint device;
populating, based on the initial input and the context data, fields in a predetermined natural language instruction to generate a populated predetermined natural language instruction;
generating, using a machine-learned content generation model to process the populated predetermined natural language instruction, a suggested portion of natural language content that completes a portion of the document;
providing, to the endpoint device, the suggested portion;
receiving, from the endpoint device, a response descriptive of a selection, via the input interface, for including the suggested portion in the document; and
updating a state of the document based on the response.

20. One or more non-transitory computer-readable media storing instructions that are executable by one or more processors to cause a computing system to perform operations, the operations comprising:
providing, to an endpoint device, an input interface configured for receiving natural language content;
receiving, from the endpoint device, an initial input of natural language content associated with a document, wherein the initial input is based on user interactions with the input interface;
receiving context data associated with the endpoint device;
populating, based on the initial input and the context data, fields in a predetermined natural language instruction to generate a populated predetermined natural language instruction;

generating, using a machine-learned content generation model to process the populated predetermined natural language instruction, a suggested portion of natural language content that completes a portion of the document;

providing, to the endpoint device, the suggested portion;

receiving, from the endpoint device, a response descriptive of a selection, via the input interface, for including the suggested portion in the document; and updating a state of the document based on the response.

* * * * *